US007183006B2

(12) United States Patent
Bamore et al.

(10) Patent No.: US 7,183,006 B2
(45) Date of Patent: *Feb. 27, 2007

(54) ADDITIVE TRANSFER FILM SUITABLE FOR COOK-IN END USE

(75) Inventors: Charles R. Bamore, Moore, SC (US); Narender P. Luthra, Simpsonville, SC (US); Walter B. Mueller, Inman, SC (US); Woodrow W. Pressley, Simpsonville, SC (US); Scott W. Beckwith, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/655,846

(22) Filed: Sep. 5, 2003

(65) Prior Publication Data

US 2004/0048083 A1 Mar. 11, 2004

Related U.S. Application Data

(63) Continuation of application No. 09/009,524, filed on Jan. 20, 1998, now Pat. No. 6,667,082.

(51) Int. Cl.
*B32B 27/00* (2006.01)
*B29D 22/00* (2006.01)

(52) U.S. Cl. ............... 428/474.7; 428/481; 428/516; 428/519; 428/520; 428/521; 428/532; 428/34.8; 428/35.2; 428/35.7

(58) Field of Classification Search ............. 428/474.7, 428/480, 34.8, 35.2, 35.7, 423.5, 423.7, 424.2, 428/481, 516, 518, 519, 520, 521, 532, 474.4
See application file for complete search history.

(56) References Cited

U.S. PATENT DOCUMENTS 2,410,089 A * 10/1946 Lundquist et al. .......... 428/343

3,779,848 A * 12/1973 Maierson ..................... 156/178

(Continued)

FOREIGN PATENT DOCUMENTS

DE 195 18 247 5/1995

(Continued)

OTHER PUBLICATIONS

Wild et al., "Determination of Branching Distributions in Polyethylene and Ethylene Copolymers," Journal of Polymer Science, Polymer Physics Edition, vol. 20, pp. 441-455, (1982).

(Continued)

*Primary Examiner*—Thao Tran
(74) *Attorney, Agent, or Firm*—Thomas C. Lagaly

(57) ABSTRACT

A multilayer film has a first layer and a second layer. The first layer comprises an additive, a binder, and a crosslinking agent. The additive is a flavor, fragrance, colorant, antimicrobial agent, antioxidant, chelating agent, and/or odor absorbent. The binder is a polysaccharide and/or a protein. The crosslinking agent comprises a compound with at least two carbonyl groups. The second layer comprises a non-water-soluble thermoplastic polymer comprising at least one member selected from the group consisting of polyolefin, polyamide, polyester, polyvinylidene chloride, polyvinyl chloride, and polystyrene. Each of the additive, binder, and crosslinking agent are present throughout a thickness of the first layer. Preferably, the first layer is coated onto the second layer, which is preferably a non-water-soluble thermoplastic polymer, e.g., polyolefin, polyamide, and/or polyester. The film is especially useful for cook-in applications, in which a food product (preferably comprising uncooked meat) is packaged in the film with the coated layer against the meat. The meat is then cooked and the additive transfers to the meat, and purge can be very low. The invention also pertains to a process for preparing a cooked food product, process for making a coated film, and articles formed from the film, such as bags and casings.

18 Claims, 5 Drawing Sheets

U.S. PATENT DOCUMENTS

| | | | |
|---|---|---|---|
| 3,860,728 A | 1/1975 | Tanner et al. | |
| 3,961,085 A | 6/1976 | Winkler et al. | |
| 4,061,786 A | 12/1977 | Winkler et al. | |
| 4,064,296 A | 12/1977 | Bornstein et al. | |
| 4,120,716 A | 10/1978 | Bonet | |
| 4,151,328 A | 4/1979 | Kigfht | |
| 4,171,381 A | 10/1979 | Chiu | |
| 4,196,220 A | 4/1980 | Chiu et al. | |
| 4,248,900 A | 2/1981 | Hammer et al. | |
| 4,287,151 A | 9/1981 | Esakov et al. | |
| 4,302,565 A | 11/1981 | Goeke et al. | |
| 4,302,566 A | 11/1981 | Karol et al. | |
| 4,308,377 A | 12/1981 | Koshugi | |
| 4,377,187 A | 3/1983 | Chiu | |
| 4,431,032 A | 2/1984 | Nicholson | |
| 4,431,033 A | 2/1984 | Nicholson | |
| 4,478,658 A | 10/1984 | Wittwer | |
| 4,496,595 A | 1/1985 | Nicholson | |
| 4,500,576 A | 2/1985 | Nicholson et al. | |
| 4,504,500 A | 3/1985 | Schneck et al. | |
| 4,504,501 A | 3/1985 | Nicholson | |
| 4,505,939 A | 3/1985 | Chiu | |
| 4,514,472 A | 4/1985 | Vrouenraets | |
| 4,518,619 A | 5/1985 | Chiu | |
| 4,543,282 A | 9/1985 | Hammer et al. | |
| 4,592,918 A | 6/1986 | Chiu | |
| 4,604,309 A | 8/1986 | Goldberg | |
| 4,606,922 A | 8/1986 | Schirmer | |
| 4,666,750 A | 5/1987 | Hammer et al. | |
| 4,741,938 A | 5/1988 | Kasti et al. | |
| 4,756,914 A | 7/1988 | Jon et al. | |
| 4,877,626 A | 10/1989 | Ande et al. | |
| 4,879,430 A | 11/1989 | Hoffman | |
| 4,889,751 A | 12/1989 | Hansen et al. | |
| 4,917,924 A | 4/1990 | Huang et al. | |
| 4,933,217 A | 6/1990 | Chiu | |
| 4,942,088 A * | 7/1990 | Gribbin et al. | 428/336 |
| 4,985,260 A | 1/1991 | Niaura et al. | |
| 5,021,252 A | 6/1991 | Huang et al. | |
| 5,030,464 A | 7/1991 | Hanson et al. | |
| 5,030,486 A | 7/1991 | Huang et al. | |
| 5,032,416 A | 7/1991 | Niaura et al. | |
| 5,049,399 A | 9/1991 | Huang et al. | |
| 5,084,283 A | 1/1992 | Oxley et al. | |
| 5,085,890 A | 2/1992 | Niaura et al. | |
| 5,108,804 A | 4/1992 | Oxley et al. | |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,288,532 A | 2/1994 | Juhl et al. | |
| 5,374,457 A | 12/1994 | Juhl et al. | |
| 5,382,391 A | 1/1995 | Juhl et al. | |
| 5,514,400 A | 5/1996 | Gray | |
| 5,520,940 A | 5/1996 | Tirkonen | |
| 5,573,797 A | 11/1996 | Wilhoit | |
| 5,573,800 A | 11/1996 | Wilhoit | |
| 5,573,801 A | 11/1996 | Wilhoit | |
| 5,695,800 A | 12/1997 | Merritt, II | |
| 5,736,180 A | 4/1998 | Peiffer et al. | |
| 5,741,533 A | 4/1998 | Lorenzo Moore et al. | |
| 5,762,968 A | 6/1998 | Swaidner et al. | |
| 5,766,751 A | 6/1998 | Kotani et al. | |
| 5,837,335 A | 11/1998 | Babrowicz | |
| 5,843,502 A | 12/1998 | Ramesh | |
| 5,858,487 A | 1/1999 | Boehler et al. | |
| 5,955,126 A | 9/1999 | Jon et al. | |
| 6,117,464 A | 9/2000 | Moore et al. | |
| 6,143,344 A | 11/2000 | Jon et al. | |
| 6,183,826 B1 | 2/2001 | Quinones et al. | |
| 6,200,510 B1 | 3/2001 | DuCharme, Jr. et al. | |

FOREIGN PATENT DOCUMENTS

| | | |
|---|---|---|
| DE | 195 18 247 A1 | 11/1996 |
| EP | 0 408 164 | 1/1990 |
| EP | 0 384 319 | 2/1990 |
| EP | 0 547 551 | 6/1993 |
| EP | 0 590 263 A2 | 4/1994 |
| EP | 0 782 916 A2 | 7/1997 |
| EP | 0 795 270 | 9/1997 |
| NZ | 236305 | 1/1993 |
| NZ | 299915 | 6/1998 |
| NZ | 328445 | 1/1999 |
| WO | WO 90/03414 | 4/1990 |
| WO | WO 93/03093 | 2/1993 |
| WO | WO 95/28281 | 10/1995 |
| WO | WO 96/07328 | 3/1996 |
| WO | WO 96/19921 | 7/1996 |
| WO | WO 96/36653 | 11/1996 |
| WO | WO 97/23390 | 7/1997 |
| WO | WO 97/36798 | 10/1997 |
| WO | WO97/49293 | 12/1997 |
| WO | WO 98/18463 | 5/1998 |

OTHER PUBLICATIONS

DELVOCID® fungicide, Technical Bulletin Jun. 11, 1990 (Gist-brocades Food Ingredients, Inc., King of Prussia, Suite 150, (No copy available).

"Inhibition of Surface Molds on Cheese by Polyethylene Film Containing the Antimycotic Imazalil" by Yih-Ming Weng & Joseph Hotchkiss of Cornell University.

1990 Annual Book of ASTM Standards, D-2732, "Unrestrained Linear Thermal Shrinkage of Plastic Film and Sheeting", pp. 368-371.

Journal of Polymer Science, Wild et al., vol. 20, pp. 441-455, "Determination of Branching Distributions in Polyethylene and Ethylene Copolymers".

Annual Book of ASTM Standards, D-3354, pp. 301-305, "Standard Test Method for Blocking Load of Plastic Film by the Parallel Plate Method".

"Development and Application of Food Packaging Films Containing Antimicrobial Agents", Dissertation of Yih-Ming Weng, 1992, pp. 13-17.

TIC GUMS Product Information Sheet (2 pgs).

\* cited by examiner

ADDITIVE TRANSFER FILM SUITABLE FOR COOK-IN END USE

This application is a continuation of application Ser. No. 09/009,524, filed Jan. 20, 1998, now U.S. Pat. No. 6,667,082.

FIELD OF THE INVENTION

The present invention relates generally to multilayer films, and methods of using same, especially to produce a packaged food product comprising cooked meat having a flavorant and/or fragrance and/or odor absorbent and/or colorant and/or antimicrobial, and/or antioxidant, and/or chelating agent therewith.

BACKGROUND OF THE INVENTION

The food packaging industry uses packaging films from which bags and casings are made which are such that they may be used in cook-in applications, i.e., uses in which a food product is packaged in the film, following which the food product is cooked while packaged in the film. The term "cook-in," as used herein with respect to packaging materials such as films, refers to packaging material structurally capable of withstanding exposure to cook-in time-temperature conditions while surrounding a food product. Cook-in foods are foods cooked in the package. The cooked product can be distributed to the customer in the original bag or the bag removed and the meat portioned for repackaging. Cook-in time-temperature conditions typically refer to a long slow cook, for example submersion in hot water at 131° F. to 149° F. for 12 hours. However, cook-in can include submersion at from 135° F. to 212° F. for 2–12 hours, or from 158° F. to 212° F. for from 1–4 hours.

During cook-in, the package should maintain seal integrity, i.e., any heat-sealed seams should resist being pulled apart during cook-in. Preferably, the film is heat sealable to itself Additionally, the packaging film substantially conforms to the packaged food product. Preferably, this substantial conformability is achieved by the film being heat shrinkable under these conditions so as to form a tightly fitting package. In other words, in an advantageous embodiment, the film is heat-shrinkable under time-temperature conditions of cook-in, i.e., the film possesses sufficient shrink energy such that submerging the packaged food product in hot water will shrink the packaging film snugly around the packaged product, representatively up to about 55% monoaxial or biaxial shrinkage at 185° F. Also, during cook-in the film should have food product adherence to restrict "cook-out," i.e., the collection of juices between the surface of the contained food product and the meat-contact surface of the packaging material; cook-out is commonly referred to as "purge." In this manner, product yield is increased by the food product retaining moisture, and the aesthetic appearance of the packaged product is not diminished by the presence of the purge.

For ham, beef, turkey, and other meat products, it is often desirable to expose the surface of the meat product to an additive, to simply coat or even suffuse the additive into the surface of the meat product. The additive can be, for example, a colorant or flavorant. The use of a smoke-containing additive is particularly common, the smoke providing both a flavor effect and a color effect to the meat product.

If the surface of the product is to be exposed to an additive, for example to produce a smoked meat product, it has for some time been standard practice in the industry to first package the meat product in a film, followed by cooking the meat product while it is packaged, followed by removing the cooked meat from the package and placing the meat in a smokehouse to impart smoke coloration and flavor. The smoked meat product is thereafter repackaged in another film, and shipped to a wholesaler, retailer, or consumer.

In addition, the unpackaging, smoking, and repackaging of the cooked meat product exposes the cooked meat product to microbial contamination, resulting in shorter shelf life for the cooked meat product. However, the need to unpackage, smoke, and repackage the meat product is a labor intensive, expensive process for the manufacturer of the smoked cooked meat product. Furthermore, the smoking step is inefficient in that only about 70% of the smoke is effective as a flavorant/colorant, with the remaining 30% of the smoke accumulating on non-food surfaces in the smokehouse, necessitating cleaning, etc. and generating waste.

Thus, it would be desirable to provide a packaged product without having to package, cook, unpackage, smoke, and repackage, together with avoiding the handling required for each of these operations. It would be desirable to entirely avoid the need to unpackage and repackage and thereby avoid the potential for microbiological contamination, together with avoiding the waste from discarding the original package, the inefficiency and waste from the smoking in a smokehouse, as well as to avoid the lower shelf life of the finally-packaged product, resulting from microbiological contamination due to excess handling of the cooked meat product.

SUMMARY OF THE INVENTION

The present invention solves the longstanding problem described above, by providing a film which can be coated with an additive which is transferred to a product during cook-in, while avoiding the handling, waste, inefficiency, and contamination generated by the steps of unpackaging, smoking, and repackaging in accordance with the prior art. Moreover, during cooking of a food product surrounded by the film, the binder and additive are both transferred from the film to the food product. After cooking, the film can be stripped off of the food product cleanly (less the binder and additive, which are transferred to the food), i.e., without any food (meat) pull-off, even though the coating prevents or reduces purge. Thus, the film according to the invention is capable of being used during cook-in to prevent or reduce purge, provide a uniform transfer of additive(s) to the surface of the meat product, while at the same time allowing a clean separation of the cooked food (especially meat) from the film, without tear-off In addition, the film of the present invention can be easily manufactured, i.e., the additive-containing coating can be applied to the film using coating or printing technology, such as gravure coating or printing, lithographic coating or printing, etc. The coating can be printed onto the film in the pattern of the product or a portion of the product, while avoiding printing the coating onto areas to be sealed. The film of the present invention is also more efficient than, for example, application of smoke to meat in a smokehouse, because substantially all of the liquid smoke coating is transferred to the meat, without waste. The film is also dry, so that it can be prepared with the additive(s) present, and stored before use, unlike films which have a wet coating thereon.

The present invention resulted from the discovery that films can be uniformly coated with certain binders in a form which are not quick to become hydrated or dissolved at the conditions of use. That is, the invention resulted from the discovery of binders which, together with crosslinkers, control the initial adhesion of the additive to the film, reduce the rate of hydration of the coating and the release of the additive, and further the binding of the coating to, for example, a cooked meat product during the cooking step. The result is that the additive-containing coating is present on the film in a form which prevents or reduces smearing of the coating when, for example, a coated film casing is filled with the meat product or flowing of the additive during cooking of the product, i.e. resulting in a mottled distribution of the additive. It was also discovered that the binder holds an additive which is released during cook-in, so that the meat product is flavored/colored in a desired manner and degree, without having to unpackage, treat, and repackage the product. In this manner, the shelf life of the resulting packaged product is increased relative to packaged products produced in accordance with the prior art method which requires unpackaging and repackaging. In addition, certain binders were discovered to be better than others, as were particular combinations of binders, such as the combination of hydroxypropyl starch with a crosslinking agent (e.g., liquid smoke), together, optionally, with fibrinogen as a second binder. In addition, particular cooking procedures were discovered which result in reduced purge when using a film in accordance with the present invention. Moreover, the pH of the coating composition was discovered to have an effect on the quantity of purge loss as well as the quality of the transfer of an additive from the film to meat packaged in the film. For example, a pH of from about 2 to 6 is considered to be a preferred range for the pH of the coating formulation used to coat a substrate thermoplastic film.

As a first aspect, the present invention pertains to a multilayer film comprising a first layer and a second layer. The first layer comprises: (i) an additive comprising at least one member selected from the group consisting of flavor, fragrance, colorant, antimicrobial agent, antioxidant, chelating agent, and odor absorbent, (ii) a binder comprising at least one member selected from the group consisting of polysaccharide and protein, and (iii) a crosslinking agent comprising a compound with at least two carbonyl groups. The second layer comprises a non-water-soluble thermoplastic polymer comprising at least one member selected from the group consisting of polyolefin, polyamide, polyester, polyvinylidene chloride, polyvinyl chloride, and polystyrene. Each of the additive, binder, and crosslinking agent are present throughout a thickness of the first layer. The presence of a crosslinking agent results in a crosslinked polymer network.

Preferably, the additive comprises at least one member selected from the group consisting of caramel, liquid smoke, FD&C Blue No 1, FD&C Blue No 2, FD&C Green No 3, FD&C Green No 6, FD&C Orange B, FD&C Red No 3, FD&C Red No 40, FD&C Yellow No 5, FD&C Yellow No 6, a lake of one or more FD&C colorant, natural brown, annatto extract, beet powder, canthaxanthin, β-Apo-8'-carotenal, carotene, cochineal extract, carmine, grape color extract, synthetic iron oxide, paprika, riboflavin, and titanium oxide, malt, natural colorant, spice, bacteriocin, allyisothiocyanate, monolaurin, 1-[2-(2,4-dichlorophenyl)-2-(propenyloxy)ethyl]-1H-imidazole, silver, benzoic acid, benzoate, hydroxycinnamic acid derivative, essential oil, sorbic acid, salt of sorbic acid, benzoate, methyl p-hydroxybenzoate, propyl p-hydroxybenzoate, p-hydroxybenzoic acid, sodium benzoate, propionic acid, salt of propionic acid, sodium lactate, dimethyl dicarbonate, diethyl dicarbonate, sulfite, diethyl pyrocarbonate, EDTA, butylated hydroxyanisole, butylated hydroxytoluene, propyl gallate, dilauryl thiodipropionate, thiodipropionic acid, gum guaiac, tocopherol, acetate, citrate, gluconate, oxystearin, ortho-phosphate, meta-phosphate, pyro-phosphate, polyphosphate, phytate, sorbitol, tartrate, thiosulfate, and lysozyme, Preferably, the additive comprises a colorant and the multilayer film, when subjected to a Standard Mottling Test, exhibits a Gray Scale standard deviation of less than about 20; more preferably, from about 0 to 20; still more preferably, from about 0 to 19; yet still more preferably, from about 0 to 18; even yet still more preferably, from about 12 to 18; even yet still more preferably, from about 0 to 17; even yet still more preferably, from about 0 to 16; even yet still more preferably, from about 0 to 15; even yet still more preferably, from about 0 to 14; even yet still more preferably, from about 0 to 13; even yet still more preferably, from about 0 to 12.

Preferably, the binder comprises at least one member selected from the group consisting of alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan, gliadin, glutenin, globulin, albumin (especially in the form of gluten), prolamin (especially corn zein), thrombin, pectin, canageenan, konjac flour-glucomannin, fibrinogen, casein (especially casein milk protein), soy protein (especially soy protein isolates), whey protein (especially whey milk protein), and wheat protein.

Another preferred grouping of binders comprises at least one member selected from the group consisting of: (A) polysaccharide esterified with at least one member selected from the group consisting of: acetic anhydride, propionic anhydride, alkyl-propionic anhydride, butyric anhydride, alkyl-butyric anhydride, succinic anhydride, alkyl-succinic anhydride, maleic anhydride, alkyl-maleic anhydride, adipic anhydride, alkyl-adipic anhydride, and vinyl acetate; and (B) polysaccharide etherified with at least one member selected from the group consisting of acrolein, epichlorihydrin, ethylene glycol, ethylene glycol oligomer, propylene glycol, propylene glycol oligomer, ethylene oxide, and propylene oxide.

Yet another preferred first layer comprises at least two different binders, i.e.: (A) a first binder comprising at least one member selected from the group consisting of alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan; and (B) a second binder comprising at least one member selected from the group consisting of gliadin, glutenin, globulin, albumin (especially in the form of gluten), prolamin (especially corn zein), thrombin, pectin, canageenan, konjac flour-glucomannin, fibrinogen, casein (especially casein milk protein), soy protein, whey protein (especially whey milk protein), and wheat protein. More preferably, the binder comprises hydroxypropyl starch.

Another preferred group of binders comprises at least one member selected from the group consisting of: (A) at least one member selected from the group consisting of polysaccharide esterified with an anhydride of the formula: $[CH_3(CH_2)_n—CO]_2—O$ where n=from 0 to 6, as well as alkyl-substituted anhydrides thereof, (B) $CH_3(CH_2)_n—COCl$, where n=from 0 to 6; (C) alkyl-substituted acid chlorides of $CH_3(CH_2)_n—COCl$, where n=from 0 to 6; (D) modified polysaccharide which results from the etherification of a base polysaccharide with at least one member selected from the group consisting of acrolein, epichlorohydrin, ethylene glycol, ethylene glycol oligomer, propylene glycol, propylene glycol oligomer, ethylene oxide, and propylene oxide.

Preferably, the second layer comprises at least one member selected from the group consisting of polyamide 6, polyamide 66, polyamide 9, polyamide 10, polyamide 11, polyamide 12, polyamide 69, polyamide 610, polyamide 612, polyamide 6I, polyamide 6T, polyamide MXD6, copolyamide, polyethylene homopolymer, ethylene/alpha-olefin copolymer, anhydride-modified ethylene/alpha-olefin copolymer, ethylene/vinyl acetate copolymer, ethylene/acrylic acid copolymer, ionomer (especially ionomers of ethylene/methacrylic acid and ethylene/acrylic acid), ethylene/methacrylic acid copolymer, anhydride-modified ethylene/methacrylic acid copolymer, polypropylene homopolymer, propylene/$C_{4-10}$ alpha-olefin copolymer, polyethylene terephthalate, PETG, and polyalkylhydroxy acid.

Preferably, the multilayer film has a total free shrink (i.e., L+T) of from about 0 to 10 percent at a temperature of 185° F.; more preferably, from about 10 to 150%; still more preferably, from about 10 to 100%.

Preferably, the additive is bound to the binder with at least one member selected from the group consisting of a covalent bond, an ionic bond, a hydrogen bond, and a dipole-dipole interaction.

Preferably, the crosslinking agent comprises at least one member selected from the group consisting of malose, glutaraldehyde, glyoxal, dicarboxylic acid, ester of dicarboxylic acid, urea formaldehyde, melamine formaldehyde, trimethylol-melamine, organic compound containing at least 2 sulfhydryl groups, and a component in liquid smoke comprising at least two carbonyl groups.

Preferably, the second layer is directly adhered to the first layer.

Preferably, the film further comprises a third layer which is between the first layer and the second layer. This third layer can serve as a primer which is applied to the second layer, for the subsequent application of the first layer. Additionally or alternatively, the third layer can contain an additive, such as one or more of the additives which can be present in the first layer, and/or a release agent, and/or a crosslinking agent. Preferably, the third layer comprises at least one member selected from the group consisting of polysaccharide and protein; more preferably, at least one member selected from the group consisting of: alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan, gliadin, glutenin, globulin, albumin (especially in the form of gluten), prolamin (especially corn zein), thrombin, pectin, canageenan, konjac flour-glucomannin, fibrinogen, casein (especially casein milk protein), soy protein, whey protein (especially whey milk protein), and wheat protein.

Preferably, the multilayer film further comprises a third layer, with the first layer being between the second layer and the third layer. Preferably, the third layer comprises at least one member selected from the group consisting of polysaccharide and protein. More preferably, at least one member selected from the group consisting of alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan, gliadin, glutenin, globulin, albumin (especially in the form of gluten), prolamin (especially corn zein), thrombin, pectin, canageenan, konjac flour-glucomannin, fibrinogen, casein (especially casein milk protein), soy protein, whey protein (especially whey milk protein), and wheat protein. This third layer, which serves as an "overcoat" over the first layer, can further comprise an additive, such as one or more of the additives present in the first layer, and/or a meat adhesion enhancing additive and/or a crosslinking agent. Preferably, the multilayer film further comprises a fourth layer which is between the first layer and the second layer. Preferably, the fourth layer serves as a primer layer, as described above.

Preferably, the multilayer film, when subjected to a Standard Mottling Test, exhibits a mottling level of from about 1 to about 2.5.

Preferably, the first layer further comprises a plasticizer. Preferably, the plasticizer comprises at least one member selected from the group consisting of polyol, sodium citrate, and triethyl citrate.

Preferably, the multilayer film further comprises a third layer comprising at least one member selected from the group consisting of polyolefin, polyamide, and polyester. More preferably, the third layer comprises at least one member selected from the group consisting of ethylene/vinyl alcohol copolymer, vinylidene chloride copolymer, polyamide, polyvinyl alcohol, polyhydroxyaminoether, and polyalkylene carbonate, ethylene/acrylic acid copolymer, polyethylene terephthalate, and ionomer. Preferably, the third layer is an inner layer, and the multilayer film further comprises a fourth layer comprising at least one member selected from the group consisting of polyolefin, polyamide, and polyester; more preferably ethylene/vinyl alcohol copolymer, vinylidene chloride copolymer, polyamide, polyvinyl alcohol, polyhydroxyaminoether, and polyalkylene carbonate, ethylene/acrylic acid copolymer, polyester, and polyethylene terephthal ate.

Preferably, the second film layer serves as a seal layer and comprises at least one member selected from the group consisting of polyolefin, polyamide, and polyester, and preferably, the film further comprises: (i) a third layer which serves as an $O_2$-barrier layer comprising at least one member selected from the group consisting of at least one member selected from the group consisting of ethylene/vinyl alcohol copolymer, polyvinylidene chloride, polyamide, polyalkylene carbonate, polyvinyl alcohol, and polyester; (ii) a fourth film layer which serves as a first tie layer and which is on a first side of the $O_2$-barrier layer and which comprises at least one member selected from the group consisting of modified ethylene/alpha-olefin copolymer, modified ethylene/unsaturated ester copolymer, modified ethylene/unsaturated acid copolymer, polystyrene and polyurethane; and (iii) a fifth film layer which serves as a second tie layer and which is on a second side of the $O_2$-barrier layer and which comprises comprising at least one member selected from the group consisting of modified ethylene/alpha-olefin copolymer, modified ethylene/unsaturated ester copolymer, modified ethylene/unsaturated acid copolymer, polystyrene and polyurethane; and (iv) a sixth film layer which serves as an abuse layer and which comprises at least one member selected from the group consisting of polyolefin, polyamide, polyester, and polyurethane. More preferably, the film further comprises: (i) a seventh film layer which serves as a strength layer and which is between the second layer and the fourth layer, and which comprises at least one member selected from the group consisting of polyolefin, polyamide, polyester, and polyurethane; (ii) a eighth film layer which serves as a strength and balance layer and which is between the fifth layer and the sixth layer, and which comprises at least one member selected from the group consisting of polyolefin, polyamide, polyester, and polyurethane; and (iii) a ninth film layer which serves as a strength and moisture barrier layer and which between the fifth layer and the sixth layer, and which comprises polyamide.

As a second aspect, the present invention pertains to a process for preparing a cooked food product, comprising: (A) packaging a food product in a multilayer film in accordance with the first aspect of the present invention, and (B) cooking the food product while the food product is packaged in the multilayer film. Preferably, the food product comprises at least one member selected from the group consisting of beef, pork, chicken, turkey, fish, and meat-substitute. Preferably, the food is cooked at a temperature of from about 145° F. to 205° F. for a duration of from about 1 to 12 hours.

As a third aspect, the present invention is directed to a process for preparing a cooked food product, comprising: (A) packaging a food product in a multilayer film in accordance with the first aspect of the present invention, and (B) cooking the food product at a temperature of from about 170° F. to 260° F. for a duration of from about 1 to 20 minutes, followed by cooking the food product at a temperature of from about 145° F. to 205° F. for a duration of from about 1 to 12 hours.

As a fourth aspect, the present invention is directed to a process for making a coated multilayer film, comprising: (A) coating an outer surface of a substrate film with a film-forming coating composition comprising: (i) water; (ii) an additive comprising at least one member selected from the group consisting of flavor, fragrance, colorant, antimicrobial agent, antioxidant, chelating agent, and odor absorbent, (iii) a binder comprising at least one member selected from the group consisting of polysaccharide and protein, and (iv) a crosslinking agent comprising a compound having at least two carbonyl groups; and (B) drying the coating composition whereby the composition becomes a first film layer, the substrate film comprising at least a second film layer. The substrate film comprises at least one member selected from the group consisting of polyolefin, polyamide, polyester, polyvinylidene chloride, polyvinyl chloride, and polystyrene. Preferably, the coating composition is applied to the film using at least one member selected from the group consisting of roll (preferably comma roll, obtained from Hirano Tecseed, of Charlotte, N.C.), gravure, flexographic, meyer rod, reverse angle doctor blade, knife over roll, two roll reverse, three roll reverse, comma roll, and lip coating.

As a fifth aspect, the present invention is directed to an article comprising a multilayer film in accordance with the first aspect of the present invention, wherein the second layer is sealed to itself or another film. Preferably, the first layer extends over (i.e., covers) only a portion of the second layer. Preferably, the article comprises at least one member selected from the group consisting of a bag, a backseamed casing, a pouch, and a thermoformed article. More preferably, the article comprises at least one member selected from the group consisting of fin-sealed backseamed casing, lap-sealed backseamed casing, butt-sealed backseamed casing, side-seal bag, end-seal bag, pouch, and perimeter sealed thermoformed article.

As a sixth aspect, the present invention is directed to a packaged product comprising: (A) a film comprising a non-water-soluble thermoplastic polymer comprising at least one member selected from the group consisting of polyolefin, polyamide, polyester, polyvinylidene chloride, polyvinyl chloride, and polystyrene; (B) a cooked meat product comprising at least one member selected from the group consisting of beef, pork, chicken, turkey, fish, and meat-substitute; and (C) a layer between the film and the cooked meat product. The C layer comprises: (i) an additive comprising at least one member selected from the group consisting of flavor, fragrance, colorant, antimicrobial agent, antioxidant, chelating agent, and odor absorbent, (ii) a binder comprising at least one member selected from the group consisting of polysaccharide and protein, and (iii) a crosslinking agent comprising a compound with at least two carbonyl groups. In the C layer, each of the additive, binder, and crosslinking agent are present throughout a thickness of the first layer. Preferably, the layer between the film and the cooked meat product is preferentially adhered to the meat product, i.e., is adhered to the meat product to a degree so that upon removing the film from the meat product, the C layer remains adhered to the meat product, rather than to the film.

DETAILED DESCRIPTION OF THE INVENTION

Figure 1:
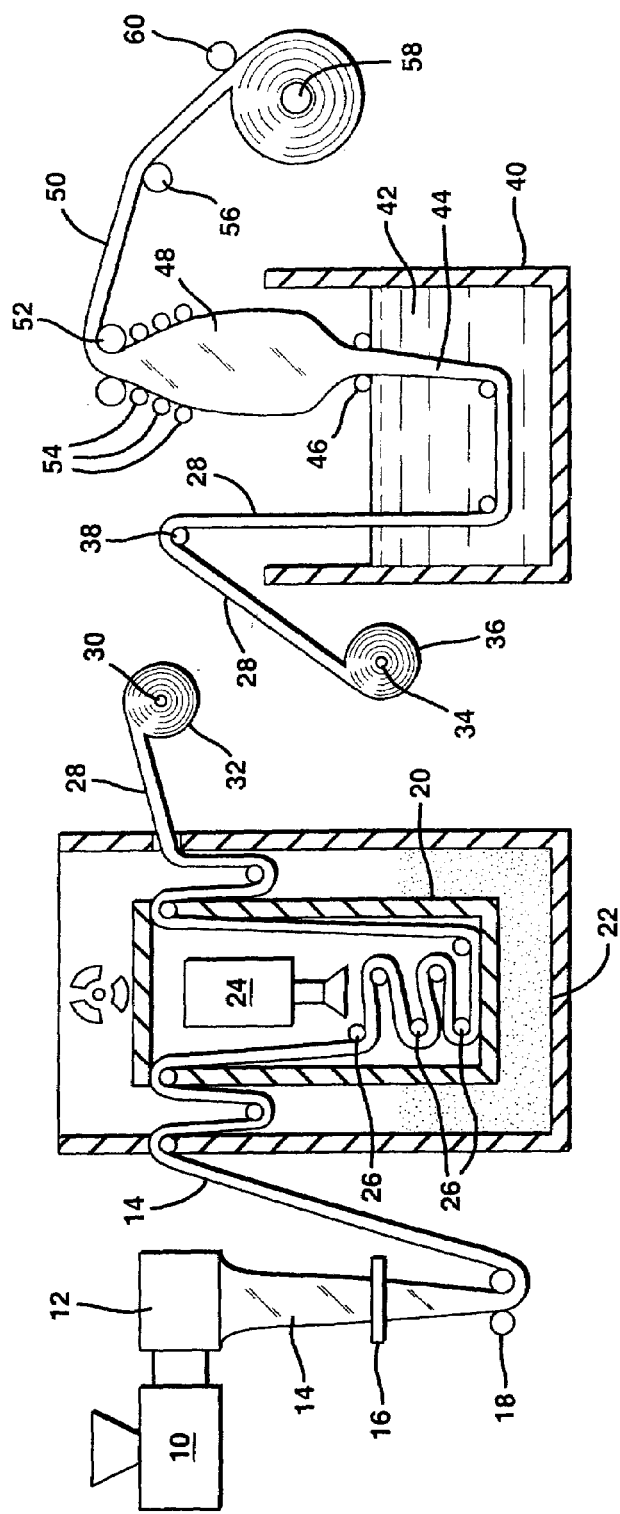
FIG. 1 illustrates a schematic view of a preferred process for making a multilayer film in accordance with the present invention.

As used herein, the prefix "alkyl" refers to, and is inclusive of, both saturated and unsaturated side chains. In other words, in order to simplify the text herein, the prefix "alkyl" is inclusive of both "traditional alkyl" sidechains as well as "traditional alkenyl" and "traditional alkynyl" sidechains.

As used herein, the term "binder" refers to a substance which adheres to an additive and/or a surface comprising a thermoplastic polymer and/or a protein-containing product, such as meat. For example, a preferred polysaccharide binder for use in the present invention is hydroxypropyl starch, e.g., $^{198}$ hydroxypropyl starch. This binder is capable of holding, entrapping, or binding to additives such as colorants, flavors, etc., while at the same time being capable of adhering to a surface comprising a thermoplastic polymer.

As used herein, the term "flavorant" refers to, and is inclusive of, spice (including, of course, pepper). Liquid smoke is an especially preferred flavorant.

As used herein, the term "colorant" is inclusive of the various FD&C colorants, together with various other colorants. Preferably, the colorant comprises at least one member selected from the group consisting of FD&C Blue No 1, FD&C Blue No 2, FD&C Green No 3, FD&C Green No 6, FD&C Orange B, FD&C Red No 3, FD&C Red No 40, FD&C Yellow No 5, FD&C Yellow No 6. FD&C Blue No. 1 is the disodium salt of 4-((4-(N-ethyl-p-sulfobenzylamino)-phenyl-(2-sulfoniumphenyl)-methylene)-(1-(-N-ethyl-N-p-sulfobenzyl)-sup2,5-cyclohexadienimine). FD&C Blue No. 2 is the disodium salt of 5,5'-indigotin disulfonic acid. FD&C Green No. 3 is the disodium salt of 4-((4-(N-ethyl-p-sulfobenzylamino)-phenyl-(4-hydroxy-2-sulfonium phenyl)-methylene)-(1-(—N-ethyl-N—P-sulfobenzyl)-sup2,5-cyclohexadienimine). FD&C Green No. 6 is 1,4-di-toluidinoanthraquinone. FD&C Red No.3 is the disodium salt of 9-o-carboxyphenyl-6-hydroxy-2,4,5,6,7-tetraiodo-3-isoxanthone (erythrosin). FD&C Yellow No. 5 is the trisodium salt of 3-carboxy-5-hydroxy-1-p-sulfophenyl-4-sulfophenylazopyrazole. FD&C Yellow No. 6 is the disodium salt of 1-p-sulfophenylazo-2-naphthol-6-solfonic acid.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the phrase "multilayer film" refers to the combination of a film comprising a first layer which is an outer layer and which contains the binder and the additive, in combination with a second layer which comprises a thermoplastic polymer. Although the first layer is preferably directly adhered to the second layer, the film can optionally contain one or more additional film layers, such as an oxygen-barrier layer with or without tie layers in association therewith, additional bulk and/or strength layers, etc. The first layer is preferably applied as a coating on a substrate film which comprises the second film layer, alone or in combination with additional film layers as described immediately above. The first layer is always an outer film layer. In articles according to the present invention, such as bags and casings, the first layer is the inside layer of the film.

As used herein, the phrase "the layer . . . comprising" refers to a film layer which has the recited components throughout the entire cross-section of the layer, as opposed to having one or more of the recited components merely on a surface of the layer. Preferably, the distribution of the recited components is uniform throughout the layer.

As used herein, the phrase "outer layer" refers to any film layer having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "drying," as used with reference to the process according to the present invention, refers to the drying of the coating which forms an outer layer of the film of the invention. Preferably, drying prevents the outer layer of the film from exhibiting substantial blocking, i.e., sticking to a degree that blocking or delamination occurs, with respect to adjacent surfaces of, for example, a film (including both the same or another film), and/or other articles (e.g., metal surfaces, etc.). Preferably, the outer layer has a moisture content of less than about 25 percent, based on the weight of the outer layer; more preferably, from about 0 to 25 percent; still more preferably, from about 0 to 10 percent; yet still more preferably, from about 0 to 5 percent.

As used herein, the term "seal" refers to any seal of a first region of a film surface to a second region of a film surface, wherein the seal is formed by heating the regions to at least their respective seal initiation temperatures. The sealing can be performed by any one or more of a wide variety of manners, such as using a heated bar, hot air, infrared radiation, ultrasonic sealing, etc., and even the use of clips on, for example, a shirred casing, etc. However, a multilayer film having a plurality coextruded layers or layer(s) extrusion coated thereon are not considered to be heat-sealed to one another by virtue of the coextrusion process or the extrusion coating process.

As used herein, the phrase "cook-in" refers to the process of cooking a product packaged in a material capable of withstanding exposure to long and slow cooking conditions while containing the food product, for example submersion in water at 57° C. to 100° C. for 2–12 hours, preferably 57° C. to 85° C. for 2–12 hours; also by submersion in water, or submersion in pressurized steam (i.e., retort) at 57° C. to 121° C. for 2–12 hours, using a film suitable for retort end-use. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. In certain end-uses, such as cook-in casings, preferably the film is heat-shrinkable under cook-in conditions so as to form a tightly fitting package. Cook-in films preferably have a tendency for adhesion to the food product, thereby preventing "cook-out," i.e., purge, which is the collection of juices between the outer surface of the food product and the meat-contact surface of the film, i.e., the surface in direct contact with the meat. Additional optional characteristics of films for use in cook-in applications include delamination-resistance, low $O_2$-permeability, heat-shrinkability representing about 20–50% biaxial shrinkage at about 185° F., and optical clarity. For hermetically sealed bags, it is preferred that the external surface of the package is subjected to a temperature of at least about 65° C.; preferably from about 65° C. to 100° C.; more preferably, from about 71° C. to 100° C.; still more preferably, from about 74° C. to 93° C.; and, even yet still more preferably, from about 77° C. to 82° C.

As used herein, the phrases "food-contact layer" and "meat-contact layer" refer to a layer of a multilayer film which is in direct contact with the food/meat in the package comprising the film. In a multilayer film, a food-contact layer is always an outer film layer, as the food-contact layer is in direct contact with the food product within the package. The food-contact layer is an inside layer in the sense that with respect to the packaged food product, the food-contact layer is the inside layer (i.e., innermost layer) of the package, this inside layer being in direct contact with the food. As used herein, the phrases, "food-contact surface" and "meat-contact surface" refer to an outer surface of a food contact layer, this outer surface being in direct contact with the food within the package.

As used herein, the phrases "meat-adhesion," "film-to-meat adhesion," "film-to-food adhesion," and "adhered", refer to maintaining direct contact between the meat surface and the meat-contact surface of the film, so that there is an absence of a substantial amount of free moisture, i.e., purge, which is water and juices emitted outside of the food/meat product. In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking. As used herein, the phrases "meat pull-off" and "meat tear-off" refer to that portion of a cook-in meat product which is torn off of the meat product upon stripping the cook-in film from the cooked meat product.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread-coating and extrusion-coating. The term laminate is also inclusive of coextruded multilayer films comprising one or more tie layers.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby altering various mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylenelalpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e., named, in terms of the monomers from which the copolymers are produced. For example, the phrase "propylene(ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perk in Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Yet still more preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. Exemplary polyolefins include homopolymers of one or more olefins, copolymers of olefin, copolymers of an olefin and an non-olefinic comonomer copolymerizable with the olefin such as vinyl monomers, modified polymers thereof, and the like. More specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/vinyl alcohol copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company, of Midland, Mich.), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or copolymerized therewith, as opposed to merely blended therewith.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

Film useful in the present invention may be monolayer film or multilayer film. If multilayer, preferably the film has a total of from 1 to 20 layers; more preferably, from 2 to 12 layers and still more preferably, from 4 to 9 layers. The multilayer film can have any total number of layers and any total thickness desired, so long as the film provides the desired properties for the particular packaging operation in which the film is used, e.g. $O_2$-barrier characteristics, free shrink shrink tension, optics, modulus, seal strength, etc.

As used herein, the phrases "inner layer" and "internal layer" refer to any layer, of a multilayer film, having both of its principal surfaces directly adhered to another layer of the film. As used herein, the phrase "inside layer" refers to an outer film layer, of a multilayer film packaging a product, or an article suitable for use in packaging a product (such as a bag or casing), which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, or an article suitable for use in packaging a product (such as a bag or casing), which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive (i.e., tie layer, which adheres two incompatible layers) for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers. Suitable polymers include polyolefins, such as those incorporating acids, esters, anhydrides or salts of carboxylic acids; and polar, non-polyolefinic materials such as polyesters, ethylene vinyl alcohol copolymer, etc.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto.

If heat-shrinkable, the film article preferably has a free shrink of from about 5–70 percent in at least one direction (i.e., the longitudinal (L) or transverse (T) direction) at 185° F.; more preferably, from about 10–50 percent at 185° F.; and, still more preferably, from about 15–35 percent at 185° F. For conversion to bags and casings, preferably the film article is biaxially oriented, and preferably the film has a free shrink, at 185° F., of at least 10 percent in each direction (L and T); more preferably, at least 15 percent in each direction. For casing end use, preferably the film has a total free shrink (L+T) of from about 30 to 50 percent at 185° F. For bag end-use, preferably the total free shrink is even higher, i.e., preferably at least 50% (L+T), more preferably from 50 to 120%. For use as a thermoformed article, preferably the film has a total free shrink (before thermoforming) of from 0 to 10% (L+T), more preferably, from 1 to 5 percent (L+T). Alternately, the oriented film article can be heat-set. Heat-setting can be done at a temperature from about 60–200° C., more preferably 70–150° C. and, even more preferably, 80–90° C.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.3 to 15 mils (1 mil equals 0.001 inch); more preferably, from about 1 to 10 mils; and still more preferably, from 1.5 to 8 mils. For shrinkable casings, the range from 1.5–3 mils is even more preferred while for laminates used in cook-in packaging, the range from 4–8 mils is even more preferred.

The film article preferably has a modulus ranging from about 5,000 to 500,000 psi, more preferably from about 10,000 to 300,000 psi, and most preferably from about 40,000 to 200,000 psi. The food-contact layer itself may have a modulus ranging from about 3,000 to 500,000 psi.

Exemplary films which can be coated with a coating formulation comprising a binder and an additive in accordance with the present invention, which can thereafter be used in accordance with the present invention, include the films disclosed in: (a) U.S. Ser. No. 669,728, filed Jun. 26, 1996, in the name of Ram K. Ramesh; (b) U.S. Ser. No. 08/539,919, filed Oct. 6, 1995, in the name of Ram K. Ramesh; U.S. Ser. No. 57,587, in the name of Lorenzo et al, filed Dec. 22, 1995; U.S. Pat. No. 4,287,151, to ESAKOV, et. al., issued Sep. 1, 1981; and U.S. Ser. No. 617,720, in the name of Beckwith et al., filed Apr. 1, 1996. Each of these documents is hereby incorporated in its entirety, by reference thereto. Film No. 1 and Film No. 2, described in detail below, are preferred films for subsequent coating with a coating formulation in accordance with the present invention.

The following multilayer film structures films according to the present invention, as the "coating" layer contains the combination of additive and binder present in the film of the present invention. In the following film structures, the individual layers are shown in the order in which they would appear in the film:

---
SEAL/FOOD-CONTACT (coating)
ABUSE/SEAL/FOOD-CONTACT (coating)
ABUSE/BARRIER/SEAL/FOOD-CONTACT (coating)
ABUSE/TIE/BARRIER/TIE/SEAL/FOOD-CONTACT (coating)
ABUSE/TIE/BARRIER/TIE/BULK/SEAL/FOOD-CONTACT (coating)
ABUSE/BULK/TIE/BARRIER/TIE/BULK/SEAL/FOOD-CONTACT (coating)
ABUSE/BULK/TIE/BARRIER/MOISTURE/TIE/BULK/SEAL/FOOD-CONTACT (coating)
---

The foregoing representative film structures are intended to be illustrative only and not limiting in scope.

The layer which is to be coated with the coating formulation (which contains the binder and the additive) comprises a thermoplastic polymer. Preferably, the thermoplastic polymer comprises at least one member selected from the group consisting of polyolefin, polyamide, polyester, polyvinylchloride, polyacrylonitrile, and polyurethane. Preferably, the heat seal layer has a thickness of from about 0.1 to 4 mils; more preferably, from about 0.2 to about 1 mil; and, still more preferably, from about 0.3 to 0.8 mils. In embodiments in which the packaged product comprises a bag in which a meat product is packaged and thereafter cooked, the seal layer preferably comprises at least 10% of a total weight of the multilayer film; more preferably, from about 12% to 25% by weight of the total multilayer film. In the case of oriented films used to make bags, it is preferred that the seal layer has a thickness less than 35% by weight of the multilayer film; more preferably from about 5 to 25% by weight of the multilayer film; still more preferably, from about 10 to 20% by weight of the multilayer film; seal layers thicker than 35% can cause problems during the orientation process.

In the film according to the present invention, the outside heat-resistant and abuse layer preferably has a thickness of from about 0.1 to 5 mils; more preferably, from 0.2 to 3 mil; still more preferably, from 0.3 to 2 mil; and yet still more preferably, about 0.5 to 1.5 mil. Preferably, the outside heat-resistant and abuse layer comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of polyolefin; still more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and still more preferably, a blend of 80 weight percent ethylene vinyl acetate copolymer (having 6.5 weight percent vinyl acetate) with 20 weight percent high density polyethylene.

The film according to the present invention optionally (and preferably) contains an $O_2$-barrier layer. The $O_2$-barrier layer is an inner layer which is between the seal layer and the abuse layer. The $O_2$-barrier layer comprises a polymer having relatively high $O_2$-barrier characteristics. Preferably, the $O_2$-barrier layer has a thickness of from about 0.05 to 2 mils; more preferably, from 0.05 to 0.5 mil; yet still more preferably, from 0.1 to 0.3 mil; and even yet still more preferably, from about 0.12 to 0.17 mils. Preferably, the $O_2$-barrier layer comprises at least one member selected from the group consisting of polymerized ethylene vinyl alcohol (EVOH), polyvinylidene chloride, polyamide, polyester and polyalkylene carbonate; more preferably, at least one member selected from the group consisting of EVOH and polyamide; still more preferably, EVOH; yet still more preferably, EVOH having about 44 mole percent ethylene mer.

The film according to the present invention may optionally further contain a tie layer, also referred to by those of skill in the art as an adhesive layer. The function of a tie layer is to adhere film layers which are otherwise incompatible in that they do not form a strong bond during coextrusion or extrusion coating. Tie layer(s) suitable for use in the film according to the present invention have a relatively high degree of compatibility with (i.e., affinity for) the $O_2$-barrier layer such as polymerized EVOH, polyamide, etc., as well as a high degree of compatibility for non-barrier layers, such as polymerized ethylene/alpha-olefin copolymers. In general, the composition, number, and thickness of the tie layer(s) is as known to those of skill in the art. Preferably, the tie layer(s) each have a thickness of from about 0.01 to 2 ml's; more preferably, from 0.05 to 0.3 mil; and, still more preferably, from about 0.1 to 0.25 mils. Preferably, the tie layer(s) each comprise at least one member selected from the group consisting of modified polyolefin ionomer, ethylene/unsaturated acid copolymer, ethylene/unsaturated ester copolymer, polyamide, and polyurethane; more preferably, at least one member selected from the group consisting of modified polyolefin and polyurethane; still more preferably, at least one member selected from the group consisting of modified ethylene/alpha-olefin copolymer, modified ethylene/unsaturated ester copolymer, and modified ethylene/unsaturated acid copolymer, even yet still more preferably, anhydride-grafted linear low density polyethylene.

Films according to the present invention may further comprises an inner layer which provides the multilayer film with desired strength, bulk, abuse, shrink, balance (i.e., anti-curl), elastic recovery, and/or optical characteristics, and preferably comprises a polymer having relatively low cost while providing these attributes. Such layers preferably have a thickness of from about 0.1 to 3 mils; more preferably, from 0.2 to 1.5 mil; still more preferably, from 0.3 to 1 mil; and yet still more preferably, from about 0.50 to 0.80 mils. Preferred polymers in such inner layers comprise at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; still more preferably, ethylene/unsaturated ester copolymer.

FIG. 1 illustrates a process for making a "substrate film" which can thereafter be coated so that it becomes a film in accordance with the present invention. In the process illustrated in FIG. 1, various polymeric formulations solid polymer beads (not illustrated) are fed to a plurality of extruders (for simplicity, only one extruder is illustrated). Inside extruders 10, the polymer beads are degassed, following which the resulting bubble-free melt is forwarded into die head 12, and extruded through an annular die, resulting in tubing tape 14 which is preferably from about 15 to 30 mils thick, and preferably has a lay-flat width of from about 2 to 10 inches.

After cooling or quenching by water spray from cooling ring 16, tubing tape 14 is collapsed by pinch rolls 18, and is thereafter fed through irradiation vault 20 surrounded by shielding 22, where tubing 14 is irradiated with high energy electrons (i.e., ionizing radiation) from iron core transformer accelerator 24. Tubing tape 14 is guided through irradiation vault 20 on rolls 26. Preferably, tubing tape 14 is irradiated to a level of from about 40–100 kGy, resulting in irradiated tubing tape 28. Irradiated tubing tape 28 is wound upon windup roll 30 upon emergence from irradiation vault 20, forming irradiated tubing tape coil 32.

After irradiation and windup, windup roll 30 and irradiated tubing tape coil 32 are removed and installed as unwind roll 34 and unwind tubing tape coil 36, on a second stage in the process of making the tubing film as ultimately desired. Irradiated tubing 28, being unwound from unwind tubing tape coil 36, is then passed over guide roll 38, after which irradiated tubing 28 is passed through hot water bath tank 40 containing hot water 42. Irradiated tubing 28 is then immersed in hot water 42 (preferably having a temperature of about 85° C. to 99° C.) for a period of about 20 to 60 seconds, i.e., for a time period long enough to bring the film up to the desired temperature for biaxial orientation. Thereafter, hot, irradiated tubular tape 44 is directed through nip rolls 46, and bubble 48 is blown, thereby transversely stretching hot, irradiated tubular tape 44 so that oriented film tube 50 is formed. Furthermore, while being blown, i.e., transversely stretched, nip rolls 52 have a surface speed higher than the surface speed of nip rolls 46, thereby resulting in longitudinal orientation. As a result of the transverse stretching and longitudinal drawing, oriented film tube 50 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 48 is maintained between pinch rolls 46 and 52, blown tubing 50 is collapsed by converging pairs of parallel rollers 54, and thereafter conveyed through pinch rolls 52 and across guide roll 56, and then rolled onto wind-up roll 58. Idler roll 60 assures a good wind-up.

The resulting multilayer film can be used to form bags, casings, thermoformed articles and lidstocks therefor, etc., which, in turn, can be used for the packaging of protein-containing products (especially meat products) in accordance with the present invention. Examples 1–9, below, provide additional details on some of the preferred films, their use in the packaging of a meat product, and the unexpected results obtained therefrom.

Figure 2:
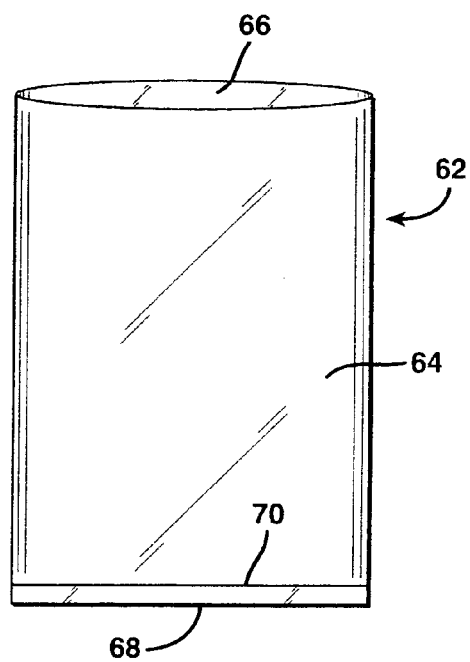
FIG. 2 illustrates a lay-flat view of a bag in accordance with the present invention.
Figure 3:
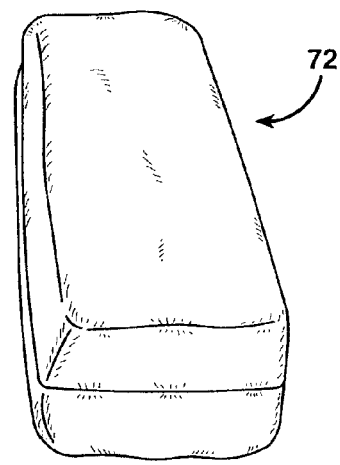
FIG. 3 illustrates a packaged product in accordance with the present invention.

FIG. 2 illustrates bag 62 in lay-flat configuration. Bag 62 is made from film 64, and has open top 66, as well as bottom 68 closed by end-seal 70. Bag 62 has a coating on the inside surface thereof (not illustrated) the coating being the inside layer of film 64. An uncooked protein-containing food product, such as a meat product, is placed inside bag 62, with sealed and evacuated bag 62 thereafter being evacuated and sealed, resulting in packaged meat product 72 illustrated in FIG. 3. The product, which is surrounded by the film, is thereafter cooked while remaining in the film. During cooking, the additive and binder are transferred from the bag to the outer surface of the cooked product, in accordance with the present invention.

Figure 4:
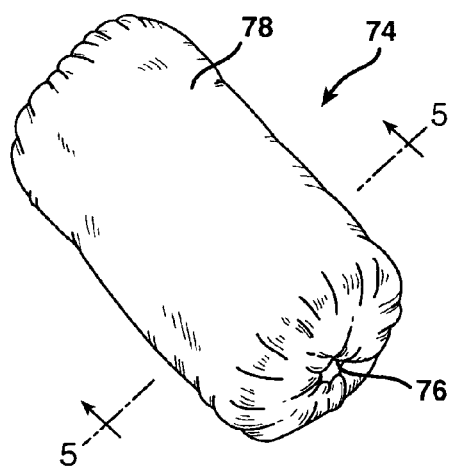
FIG. 4 illustrates a perspective view of a packaged product in accordance with the present invention.

FIG. 4 illustrates another embodiment of a packaged product 74 of the present invention, the product being packaged in a casing closed by a pair of clips 76 at each end thereof, with only one clip being illustrated in the perspective view of FIG. 4. Film 78, used to package the meat product inside the casing, can be, for example, Film No. 1 or Film No. 2, discussed in detail below.

Figure 5A:
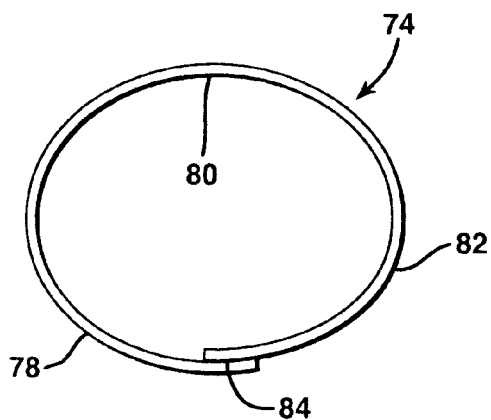
FIG. 5A illustrates a first embodiment of a cross-sectional view through line 5—5 of the packaged product illustrated in FIG. 4.

FIG. 5A illustrates a first cross-sectional view of packaged product 74, i.e., taken through line 5—5 of FIG. 4. FIG. 5A represents a cross-sectional view of a lap-sealed casing comprising film 78 having a coated inside surface region 80, with an uncoated portion heat sealed to outside surface 82 at heat seal 84, the heat seal being located where a first film region overlaps a second film region.

Figure 5B:
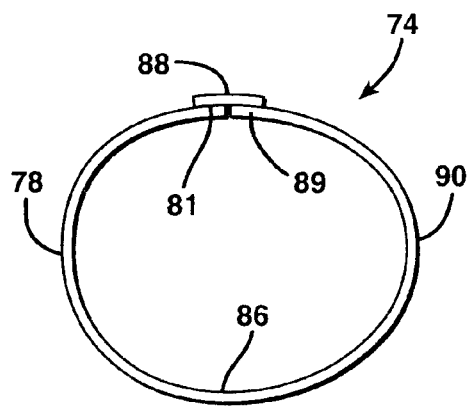
FIG. 5B illustrates a second embodiment of a cross-sectional view through line 5—5 of the packaged product illustrated in FIG. 4.

FIG. 5B illustrates an alternative cross-sectional view of packaged product 74, i.e., also taken though line 5—5 of FIG. 4. FIG. 5B represents a cross-sectional view of a butt-sealed backseamed casing comprising film 78 having a coated inside surface region 86. Casing film 78 is heat sealed to butt-seal tape 88. Casing film 78 has inside surface 86 and outside surface 90. Outside surface 90 is heat-sealed to butt-seal tape 88 at seals 87 and 89, where each of the edges of casing film 78 are abutted in close proximity to one another. In this manner, butt-seal tape 88 provides a longitudinal seal along the length of butt-sealed casing film 78. Although butt-seal tape 88 can be made from a monolayer film or a multilayer film, preferably butt-seal tape 88 is preferably made from a multilayer film.

Figure 5C:
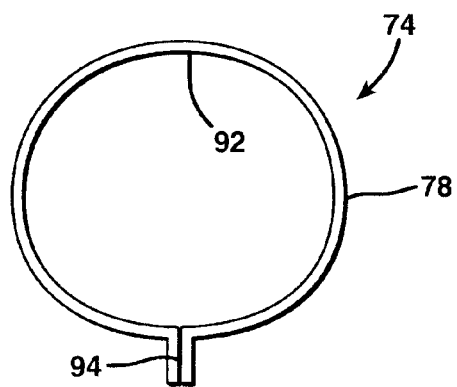
FIG. 5C illustrates a third embodiment of a cross-sectional view through 5—5 of the packaged product illustrated in FIG. 4.

FIG. 5C illustrates a cross-sectional view of a third alternative of packaged product 74, i.e., again taken through line 5—5 of FIG. 4. FIG. 5C represents a cross-sectional view of a fin-sealed casing comprising film 78 having a coated inside surface region 92. Along the edges of the inside surface of casing film 78 are two uncoated regions which are heat sealed to one another at seal 94, which forms a "fin" which extends from casing 74.

Figure 6:
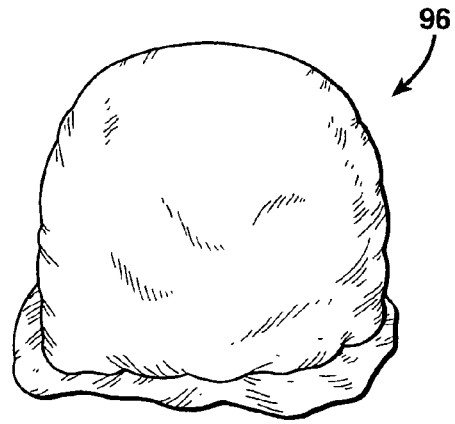
FIG. 6 illustrates a perspective view of an alternative packaged product according to the present invention.

FIG. 6 illustrates yet another embodiment of a packaged cooked meat product 96, which is in accordance with the present invention. The product, a cooked meat product, is packaged in a heat-sealed, thermoformed web having a lidstock web sealed thereto, with the meat product being cooked while being within the sealed thermoformed package. A portion of each of the films, i.e, the thermoformed web and the lidstock film, have the binder/additive coating thereon, for contact with the product and transfer to the product during cook-in. In the packaging process resulting in the packaged product illustrated in FIG. 6, a forming web and a non-forming web can be fed from two separate rolls, with the forming web being fed from a roll mounted on the bed of the machine for forming the package "pocket," i.e., the product cavity. The non-forming (lidstock) web is usually fed from a top-mounted arbor for completing the airtight top seal of the package. Each web has its meat-contact/sealant surface oriented towards the other, so that at the time of sealing, the sealant surfaces face one another. The forming web is indexed forward by transport chains, and the previously sealed package pulls the upper non-forming web along with the bottom web as the machine indexes.

The first step in the packaging process is the formation of the product cavity in the forming web. The cavity forming is a three-step process: index—heat—form. While one cavity is being formed, the web for the next cavity is undergoing preheating before being indexed over the pocket-forming die. To accomplish this, the forming web is heated from 70° C. to 80° C. by being pressed against a contact-type heater by means of vacuum. The forming web is then formed by use of compressed air or vacuum, or both. Compressed air pushes the heated film into the die cavity from above and, in turn, vacuum pressure pulls the film into shape from within the die. A plug is used to assist the movement of the heated film into the die cavity.

After forming, the transport chains carry the empty pocket to the loading station where the product is either hand loaded or pumped into the cavity. The transport chains then carry the loaded product to the vacuum and sealing station.

The sealing process is a series of operations occurring simultaneously or with a slight overlap. Once the top film is in place over the, filled cavity, the sealing chamber closes. Package air is exhausted between the top and bottom films. The upper chamber, or lid, employs a heated seal plate set at from 302° F. to 338° F., which bonds the non-forming web and the forming web together.

The vacuum in the seal die balances chamber pressures, and ensures that no air is trapped between the product and the forming web. The sealing diaphragms, empty of air, are now filled with compressed air. This presses the heated sealing plate against the upper film, compressing the heat-sealable surfaces of the two webs between the sealing plate and the T-rubber sealing gasket. The heat and pressure of the sealing plate causes the two surfaces of the films to bond together, sealing the product in a vacuum environment. Approximately 0.4 to 0.5 seconds after sealing ends, the upper and lower chambers are vented to the atmosphere, causing the top and bottom films to collapse around the product. Now, the sealing diaphragms evacuate and the sealing plate moves back up. Outside air rushes into the chambers. When the air pressures are equalized, the die bottom can move down, allowing the package to be indexed out of the seal station.

The sealed package is then separated from the web by way of a contour knife system. The packages are conveyed through a hot water (205° F.) shrink tunnel. The packages are placed on racks and cooked in a high humidity oven. The product is then chilled and available for shipping or for further processing, which may involve stripping the package off of the product.

The polymer components used to fabricate multilayer films according to the present invention may also contain appropriate amounts of other additives normally included in such compositions. These include slip agents such as talc, antioxidants, fillers, pigments and dyes, radiation stabilizers, antistatic agents, elastomers, and the like additives, as known to those of skill in the art of packaging films.

Although film useful in the present invention need not always be irradiated, in at least one preferred embodiment, the film is irradiated. In the irradiation process, the film is subjected to an energetic radiation treatment, such as corona discharge, plasma, flame, ultraviolet, X-ray, gamma ray, beta ray, and high energy electron treatment, which may alter the surface of the film and/or induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. To produce crosslinking, the polymer is subjected to a suitable radiation dosage of high energy electrons, preferably using an electron accelerator, with a dosage level being determined by standard dosimetry methods. A suitable radiation dosage of high energy electrons is in the range of up to about 16–166 kGy, more preferably about 30–139 kGy, and still more preferably, 50–100 kGy. Preferably, irradiation is carried out by an electron accelerator and the dosage level is determined by standard dosimetry methods. However, other accelerators such as a Vander Graff or resonating transformer may be used. The radiation is not limited to electrons from an accelerator since any ionizing radiation may be used. A preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness. As used herein, the term corona treatment also refers to all forms of plasma treatment.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Packaged products in accordance with the present invention include beef, turkey, pork, fish, and meat substitutes.

The invention is illustrated by the following examples, which are provided for the purpose of representation, and are not to be construed as limiting the scope of the invention. Unless stated otherwise, all percentages, parts, etc. are by weight.

Preparation of Film No. 1

A 5¾" wide (lay-flat dimension) tube, called a "tape", was produced by the coextrusion process described above and illustrated in FIG. 1, wherein the film cross-section (from inside to outside of the tube) was as follows:

TABLE 1

| Layer Function(s) and Arrangement | Layer Composition | Layer Thickness (mils) |
|---|---|---|
| seal | blend of 70% LLDPE#1 and 30% EAA#1 | 3.2 |
| strength | blend of 80% EVA#1 and 20% HDPE#1 | 3.5 |
| tie | anhydride-grafted LLDPE#2 | 0.9 |
| $O_2$-barrier | 100% EVOH | 1.0 |
| strength and moisture barrier | blend of 50% Nylon#1 and 50% Nylon#2 | 1.7 |
| tie | anhydride-grafted LLDPE#2 | 1.6 |
| strength and balance | blend of 70% EVA#1 and 30% EAA#1 | 3.1 |
| outside | LLDPE#1 | 2.8 | wherein:

LLDPE#1 was DOWLEX® 2244A, linear low density polyethylene, obtained from Dow Plastics, of Freeport, Tex.;

EAA#1 was PRIMARCOR® 1410 ethylene/acrylic acid copolymer obtained from Dow Plastics, of Freeport, Tex. This copolymer had a acrylic acid content of 9.5% by wt. and a melt index of 1.5;

EVA#1 was PE 5269T (TM) ethylene vinyl acetate copolymer, obtained from Chevron Chemical Company, of Houston, Tex.;

HDPE#1 was FORTIFLEX® J60-500C-147 high density polyethylene, obtained from Solvay Polymers, Inc., Deer Park, Tex.;

LLDPE#2 was TYMOR® 1203 linear low density polyethylene having an anhydride functionality grafted thereon, obtained from Morton International, of Chicago, Ill.;

EVOH was EVAL® LC-E105A polymerized ethylene vinyl alcohol, obtained from Eval Company of America, of Lisle, Ill.;

NYLON#1 was ULTRAMID® B4 polyamide 6, obtained from BASF corporation of Parsippany, N.J.;

NYLON#2 was GRILON® CF6S polyamide 6/12, obtained from EMS-American Grilon Inc., of Sumter, S.C.;

All the resins were coextruded at between 380° F. and 500° F., and the die was heated to approximately 420° F. The extruded tape was cooled with water and flattened, the flattened width being 5¾ inches wide in a lay flat configuration. The tape was then passed through a scanned beam of an electronic cross-linking unit, where it received a total passage of about 64 kilo grays (kGy). After irradiation, the flattened tape was passed through hot water (approximately 206° F. to 210° F.) for about 20 seconds. The resulting heated tape was inflated into a bubble and oriented into a film tubing having a lay-flat width of 16½ inches and a total thickness of about 2.4 mils. The bubble was stable and the optics and appearance of the film were good. The film tubing was determined to have about 20% free shrinkage in the longitudinal direction and about 30% free shrinkage in the transverse direction, when immersed in hot water for about 10 minutes, the hot water being at a temperature of 185° F., i.e., using ASTM method D2732-83. The resulting tubing was slit into film.

Preparation of Film No. 2

A 2.4 mil film was made slitting a tubing made by the process of FIG. 1, the tubing having the following structure:

TABLE 2

| Layer Function(s) and Arrangement | Layer Composition | Layer Thickness (mils) |
|---|---|---|
| inside and seal | blend of Nylon#3 (50%) and Nylon#2 (50%) | 0.48 |
| bulk | blend of 80% EVA#1 and 20% EAO#1 | 0.50 |
| tie | anhydride-grafted LLDPE#2 | 0.15 |
| O$_2$-barrier | EVOH | 0.15 |
| tie | anhydride-grafted LLDPE#2 | 0.15 |
| abuse and bulk | blend of 80% EVA#1 and 20% LLDPE#3 | 0.97 |

NYLON#3 was VESTAMID (TM) Z7319 polyamide 12, obtained from Huls America, Inc., of Piscataway, N.J.;

LLDPE#3 was DOWLEX® 2045.03 linear low density polyethylene, obtained from Dow Plastics, of Freeport, Tex.;

EAO#1 was EXACT 4011 (TM) homogeneous ethylene/alpha-olefin copolymer, obtained from the Exxon Chemical Company, of Baytown, Tex.; otherwise, each of the resins was as identified in Film No. 1, above.

Preparation of Coating Formulation No. 1

This example demonstrates preparation of a typical coating formulation, the film coating process, the backseaming of the film to make casing and cooking of the meat for color transfer from casing to the meat. The coating formulation was prepared by the following procedure:

| | |
|---|---|
| Liquid Smoke #1 | 33.3 grams |
| Hydroxypropyl starch #1 | 35 grams |
| Caramel #1 | 98 grams |
| Glycerol #1 | 3.5 grams |
| Water | 85.7 grams |

Hydroxypropyl Starch #1 was PURE COTE™ B790 hydroxypropyl starch, obtained from Grain Processing Corporation, of Muscatine, Iowa;

Liquid Smoke #1 was Charsol Select® 24 liquid smoke solution having a pH of approximately 2.4, obtained from Red Arrow Products Co., Inc., of Manitowoc, Wis.;

Caramel #1 was Caramel 252™, obtained from D.D. Williamson and Company, Inc., of Louisville, Ky.;

Hydroxypropyl Starch #1 was slowly added to a stirred solution of Liquid Smoke #1 and water, while the solution was heated to a temperature of approximately 150° F. The temperature of the stirred mixture was then maintained at about 150° F. for about ½ hour, whereafter the viscosity of the mixture dropped substantially due to the hydration of the hydroxypropyl starch. The mixture was then cooled to room temperature, and the Caramel #1 and Glycerol #1 were added to the mixture.

EXAMPLE 1

Coated Film 1A: Coating, Backseaming, Stuffing, Sealing, Cooking, and Color Transfer Coating Formulation No. 1 was used to coat Film No. 1. Prior to the coating process, the film was corona treated on the food-contact side (i.e., the layer comprising 70% LLDPE #1 and 30% EAA#1). The coating was applied using a gravure roll in such a manner that approximately one inch along each of the machine-direction edges of the film remained uncoated. The resulting coated film was then slit on one side to completely remove one of the uncoated edge portions of the film. The remaining coated film (having one uncoated edge region) was folded longitudinally, i.e. along its length, about a forming shoe, with opposed edges being joined by applying a heat seal longitudinally over the overlap to form a lap seal, done in intermittent, i.e., semi-continuous manner (commonly referred to as backseaming). The backseaming was done in such a manner that for the overlap, the uncoated part of the film was the outside surface of the resulting backseamed casing. The sealing was carried out so that the resulting tubing had almost no uncoated region on its inside surface. This casing was then placed on a shirring tube, clipped at one end and filled with uncooked turkey meat from the open end, followed by being clipped and cut on the opposite end.

The additive (i.e., caramel and liquid smoke) transfer evaluation was made using a turkey breast meat batter. To 40 pounds (lb.) of diced or ground meat was added:

22.6 lb. of water,
1.3 lb. of salt,
1.3 lb. of carragean,
0.3 lb. of sodium polyphosphate, and
1.0 lb. of starch.

The meat and the added ingredients were blended in a vacuum mixer at 4° C. for at least 45 minutes. The backseamed casing was filled with the meat batter using a mechanical piston stuffer and sealed with a Tipper Clipper® machine obtained from the Tipper Tie Inc. of Apex. North Carolina. The filled and clipped casings (i.e., chubs) typically measured 23 to 25 cm in circumference and 20 to 40 cm in length.

The meat was then cooked for several hours in a high humidity environment, i.e., beginning at 145° F. and ending at 170° F. After chilling, the meat was evaluated for color transfer. Upon stripping the film from the meat, there was no meat pull-off, the level of purge was very low, and it was found that the color had been completely transferred to the meat.

Product evaluation included uniformity of the color transfer, purge loss, gel formation, and color smearing. Purge loss was measured by weighing the chub after cooking and cooling to about 3° C., removing the casing and blotting both the casing and meat surface to remove any free moisture, and then weighing the meat plus the casing. The difference between the two weights was the weight of purge lost from the product during cooking. The uniformity of color transfer, gel formation and color smearing were subjective observations. Unpredictably and surprisingly: (a) the coating remained intact during the shirring process; (b) the distribution of the additives (liquid smoke and caramel) was uniform on the surface of the cooked meat (neither mottled nor smeared), and (c) the film was clear and what little purge there was not highly colored.

EXAMPLE 2

Coated Film 1B: Coating, Backseaming, Stuffing, Sealing, Cooking, and Color Transfer The coating of the other side of Film No. 1 demonstrated that the coating could be carried out on a 100% LLDPE surface. The 100% LLDPE surface of Film No. 1 was corona treated and coated by the method described immediately above. The resulting coated film was then also backseamed as described immediately above, resulting in a backseamed casing having the coating on the inside surface thereof.

A packaged product was made as in Example 1, with the meat also being cooked as described in Example 1. Unpredictably and surprisingly: (a) the coating remained intact during the shirring process; (b) the distribution of the additives (liquid smoke and caramel) was uniform on the surface of the cooked meat (neither mottled nor smeared), and (c) the film was clear and what little purge there was not highly colored.

EXAMPLE 3

Film Coating Backseaming, Stuffing, Sealing, Cooking, and Color Transfer

The coating of Film 2 demonstrated that the coating could be carried out on a polar surface such as polyamide. Before coating, corona treatment was applied to the outer layer containing of 50% Nylon #1 and 50% Nylon #2. The coating of Film No. 2 was carried out in the manner as generally described for the coating of Film 1. The coating was applied to the outer surface which had been corona treated. The resulting coated film was then backseamed as described above, resulting in a lap-sealed backseamed casing. This backseamed casing was then clipped at one end and filled with uncooked turkey meat from the open end, and clipped again. The meat was then cooked in a high humidity environment from 145° F. to 170° F. for several hours. After chilling the meat was evaluated for color transfer. Upon stripping the film from the meat, it was found that the color had been completely transferred to the meat. Unpredictably and surprisingly: (a) the coating remained intact during the shirring process; (b) the distribution of the additives (liquid smoke and caramel) was uniform on the surface of the cooked meat (neither mottled nor smeared), and (c) the film was clear and what little purge there was not highly colored.

Thus, in each of Examples 1, 2, and 3, it was demonstrated that successful coating and color transfer could be made for both sides of Film 1, and the polyamide side of Film 2. More particularly, it was demonstrated that successful coating and color transfer could be achieved using either a non-polar outer film surface, such as is present for an outer layer of LLDPE, as well as a more polar outer film surface, such as is present for an outer layer consisting of polyamide.

EXAMPLE 4

Corona Treatment Can Improve Performance of Coated Film

In some cases corona treatment may can improve the successful transfer of the additive from the coated film to a food product, such as meat. In Film 1, the layer containing 70% LLDPE #1 and 30% EAA#1 was corona treated, with the film thereafter being coated in the manner described above for Coated Film 1A. Several different Film No. 1 samples were tested, each having a different level of corona treatment. The films were corona treated using Enercon Treater (Model Number SS2542) corona treatment machine, at power settings of 1.0, 1.75, 2.75 and 3.5 kW (kilowatts). Each of the films passed through the machine at a speed of 100 feet per minute. The treated films were coated and tested for color transfer as described in Film 1A, above. In all the cases except where the film was treated at a power of 1 kW, the color transfer was excellent. A slight ruboff of color during the meat filling process was seen with the casing that was made from the film which was treated with corona treater power of 1 kW. The rub-off for the film treated at 1 kW was considered to be somewhat undesirable, as the rub-off produced an visibly detectable uneven distribution of the color on the food product. However, no observable rub-off occurred for the films treated at the power settings above 1.0 kW. This result was surprising and unpredictable.

EXAMPLE 5

Preventing Film Blocking through Use of Low-Tar Liquid Smoke Formulation

It was discovered that the selection of a liquid smoke having a low tar content reduced the tendency of the coated film to block, i.e., for successive film wraps on a roll of film to adhere to one another. Film No. 1 was coated with a coating formulation in accordance with Coating Formulation No. 1 as set forth in Example 1 above, except that instead of the formulation containing Charsol Select® 24 liquid smoke, a low tar liquid smoke was selected, i.e., Special A liquid smoke, obtained from Red Arrow Products Co. Inc., of Manitowoc, Wis. The resulting coated films were evaluated for blocking by a method similar to ASTM 3354—Procedure B (hereby incorporated in its entirety, by reference thereto), where a Kayeness™ blocking instrument was used. Samples were cut and layered and placed under a slab weighing 32 lbs. for approximately 100 hours before testing. The testing was done in the machine direction. Maximum load was 212.8 grams. The sample with Charsol Select® 24 liquid smoke did not separate at full load, i.e., 212.8 grams, whereas the sample with low-tar smoke that was coated under the same condition, separated at a load of 119 grams. This result was surprising and unpredictable. Thus, preferably the liquid smoke has a tar level of from 0 to 2%; more preferably from 0 to 1%; still more preferably, from 0 to 0.5%.

EXAMPLE 6

Coating Formulation Containing Both Hydroxypropyl Starch and Fibrinogen Resulted in Decreased Blocking It was discovered that a coating formulation containing fibrinogen also reduced the tendancy of the coated film to block. The fibrinogen was the fibrinogen component of FIBERMIX® isolated components of blood from cattle, which was obtained from FNA Foods, of Calgary, Alberta, Canada. Film No. 1 was coated with a coating formulation similar to Coating Formulation No. 1, except that one-half of the PURE COTE™ hydroxypropyl starch was replaced with fibrinogen. Otherwise, the coating was carried out as described above for coated film 1A. The coated film was tested for blocking using the procedure described above. The sample separated at 13 grams weight, i.e., a degree of blocking which is substantially lower than that the weight applied to either of the films tested immediately above. This result was surprising and unpredictable.

EXAMPLE 7

Reduction of Purge Loss via Modification of Cooking Procedure

This example demonstrates that the purge loss which occurs (using a casing coated with a color transfer agent {liquid smoke and caramel} and PURE COTE™ hydroxypropyl starch i.e., in accordance with the present invention) can be reduced by the modification of the conventional cooking procedure. The conventional cooking procedure generally used in the industry to cook turkey meat batter in a tubing or casing is a gradient process, beginning at about 145° F. and ending at a final cook temperature at about 170° F., over a period of from about 2 to 10 hours. Using a coated film as in Example 1, it was discovered that the purge loss could be reduced by using an initial cooking of the turkey meat batter at 190° F. for 12 minutes, followed by cooking employing the conventional cooking procedure described above. In Table I, immediately below, results from the effect of this "spike-cooking" procedure are shown. In Table 3 is shown the loss due to purge seen in the first twelve minutes of the cooking done at 190° F. at 2 minute intervals up to 12 minutes. As can be seen from the results in Table 3, the purge loss was reduced from 1.39% to 0.13% by precooking the meat at 190° F. for 12 minutes. Lesser amounts of purge loss reduction were obtained by precooking the turkey meat batter for a lesser time period.

TABLE 3

(Effect of pre-heating at 190° F. on purge loss from a color transfer casing)

| Treatment Time @ 190° F. | Purge Loss (%) | Depth of Cook (mm) |
| --- | --- | --- |
| Without Coating | | |
| 0 min. | 0.13 | 0 |
| With coating | | |
| 0 min | 1.39 | 0 |
| 2 min | 0.36 | 2 |
| 4 min | 0.36 | 4 |
| 6 min | 0.48 | 5 |
| 8 min | 0.25 | 6 |
| 10 min | 0.22 | 7 |
| 12 min | 0.13 | 8 |

EXAMPLE 8

Purge Loss is Dependent on the Nature of the Uncooked Meat

It was also discovered that purge loss was also dependent on the nature of uncooked meat. For example, the turkey meat batter used in the cooking spike example above (Example 7) was instead made of chunks of turkey meat. However, a similar color-transfer process was carried out but instead of chunks of turkey meat, uncooked turkey meat batter was used. The turkey meat batter had more surface area available for the extraction of the myofibrillar protein, resulting in greater water-binding capacity. The coating formulation was similar to the formulation used in the spike-cooking example above, and the cook cycle involved a cooking spike at 190° F. for 10 minutes. However, the purge loss ranged from 0.02–0.04%, instead of 0.22% that was seen with the turkey meat batter used in the spike-cooking of Example 7 above. Thus, it was discovered that the amount of purge is inversely proportional to the surface area of a meat product.

EXAMPLE 9

Presence of Fibrinogen in Coating Composition Reduced Purge

The presence of fibrinogen in the coating formulation was discovered to reduce the amount of purge, without having to use a spike heating procedure as described above. A fibrinogen-containing coating formulation was made by the procedure described above, and thereafter used to coat Film No. 1. That is, Film No. 1 was coated with a coating formulation similar to Coating Formulation No. 1, except that one-half of the PURE COTE™ hydroxypropyl starch was replaced with fibrinogen. Otherwise, the coating was carried out as described above for coated film 1A. The resulting coated film was used to package a turkey meat batter product which was cooked and evaluated for purge. Even though no heating spike was used, the purge loss was found to be only 0.16%. This result was surprising and unpredictable. See Table 1, which indicates that without fibrinogen, the purge loss was about 1.39%. Moreover, this may indicate that the mechanism of the reduction in the extent of purge loss by preheating is related to the mechanism resulting in the reduction in purge from the addition of fibrinogen to the coating formulation may be very similar. That is, it could be that both the heat spike cooking procedure by itself, or the presence of fibrinogen in the coating media, provide an interaction between the fibrinogen and the myofibril proteins that result in a protein skin on the surface of the meat product. The skin is probably formed in the early part of the cook cycle, retarding the migration of water from the meat blend.

EXAMPLE 10

It has also been discovered that by first coating a thermoplastic film with a first coating comprising binder, crosslinker, and additive, and thereafter coating this first coating with a second coating of, for example soy protein isolate, the level of purge is reduced. This is an important feature because typically for ham products the purge level during the existing smoking process in the industry ranges from about 10 to 12 percent. By using the second coating over the first coating, i.e., an "overcoat," the level of purge for ham can be reduced from, e.g., about to 10 to 12% purge loss, to, about 2% purge loss. Note that, as in Example 9, purge can be reduced without the presence of an overcoat, by providing a blend of binders, e.g., a 50:50 blend of PURE COTE™ hydroxypropyl starch and soy protein isolate.

Table 4, immediately below, shows the purge-lowering effect of providing the first film layer, which comprises the binder, additive, and crosslinking agent, with an overcoat layer which comprises either 100 percent soy protein isolate, or a 50:50 blend of PURE COTE™ hydroxypropyl starch and soy protein isolate. The film was used for the packaging and cooking of a ham meat batter. As can be seen, for example, in Sample 1 and Sample 2, the level of purge goes down from 8.7% to 1.0% on overcoating with soy protein isolate. Similarly, as seen in Sample 3 and Sample 4, the extent of purge goes down from 6.6% to 2.8% on overcoating with a 50:50 blend of soy protein isolate and PURE COTE™ hydroxypropyl starch.

TABLE 4

Results of Sectioned and Formed Ham Test

| Sample Designation | Coating Formulation/ Overcoat Formulation | Purge Loss (% by wt) |
|---|---|---|
| 1 | Coating Formulation: Binder: Pure-COTE (25% solids) Smoke: Charsol LFB Special A liquid smoke Color: Williamson 252 caramel Overcoat: None | 8.7 |
| 2 | Coating Formulation: Same as Sample 1 Overcoat Formulation: 35:10 (wt:wt) soy protein isolate plus PURE COTE ™ aqueous blend | 1.0 |
| 3 | Coating Formulation Binder: PURE COTE ™ (25% solids) Smoke: Charsol LFB Special A liquid smoke Color: Warner Jenkins caramel Overcoat: None | 6.6 |
| 4 | Coating Formulation: Binder: 35:10 (wt:wt) soy protein isolate plus PURE COTE ™ aqueous blend Smoke: Charsol LFB Special A liquid smoke Color: Warner Jenkins caramel Overcoat: None | 2.8 |

The Standard Mottling Test

The above-described procedure in Example 1 was carried out. A turkey meat batter was then cooked for several hours in a high humidity environment at 180° F. After chilling, the cooked chubs were evaluated for color transfer. Samples were measured with the Gray Scale before being stripped and evaluated for color uniformity.

The cooked turkey meat batter chubs were photographed using a color CCD (charge coupled device) video camera. The camera was mounted in a box 50 cm above the bottom of the cabinet which also held a tub containing the immersed chub being photographed. A bank of double 15 W fluorescent lamps was mounted on each side of the interior of the cabinet such that the light was striking the subject at approximately a 45 degree angle. The turkey meat batter chubs were immersed in a tub of water for photographing to reduce the glare from the light sources. Images were captured using a video capture board and image analysis (IA) software (IP Lab Spectrum P, Signal Analytics Corporation, Vienna, Va.).

For purposes of image processing and data analysis, the colored pictures that were captured were converted to grayscale images using the IA software. A rectangular region of interest (ROI) encompassing the maximum amount of the product possible was selected (approximately one-third of the surface area of one side of the chub, which had a circumference of from about 8.5 to 9 inches, and length of about 10–11 inches), and was analyzed for mean and standard deviations in pixel values using the analytical features of the software. The mean was simply the average "grayness" of the image, and was not of particular interest. The standard deviation was of great importance because it was an indicator of the uniformity of the "grayness" in the image, and thus of the degree of color variation (i.e., mottling) on the surface of the chub.

The apparatus used in determining the grayness of the image was as follows: Lights: Phillips Softone™ F15T8/SF, obtained from Phillips Lighting Co., of Somerset, N.J.; Housing for bulbs: Model XX-15L, UVP Inc., San Gabriel, Calif. Camera: COHU Model 2222-1040/AL07, obtained from COHU, Inc, San Diego, Calif. (the camera settings were F=1.25 and C=12); Video Capture Board: SCION CG-7, obtained from Scion Corporation, Frederick, Md.; Computer: Power Computing, Power Base 180 (now owned by Apple Computer, Inc., Cupertino, Calif. (and uses Mac Operating System 7.5.5); Imaging Software: IPLab Spectrum P, Signal Analytics Corp., Vienna, Va.

Figure 7:
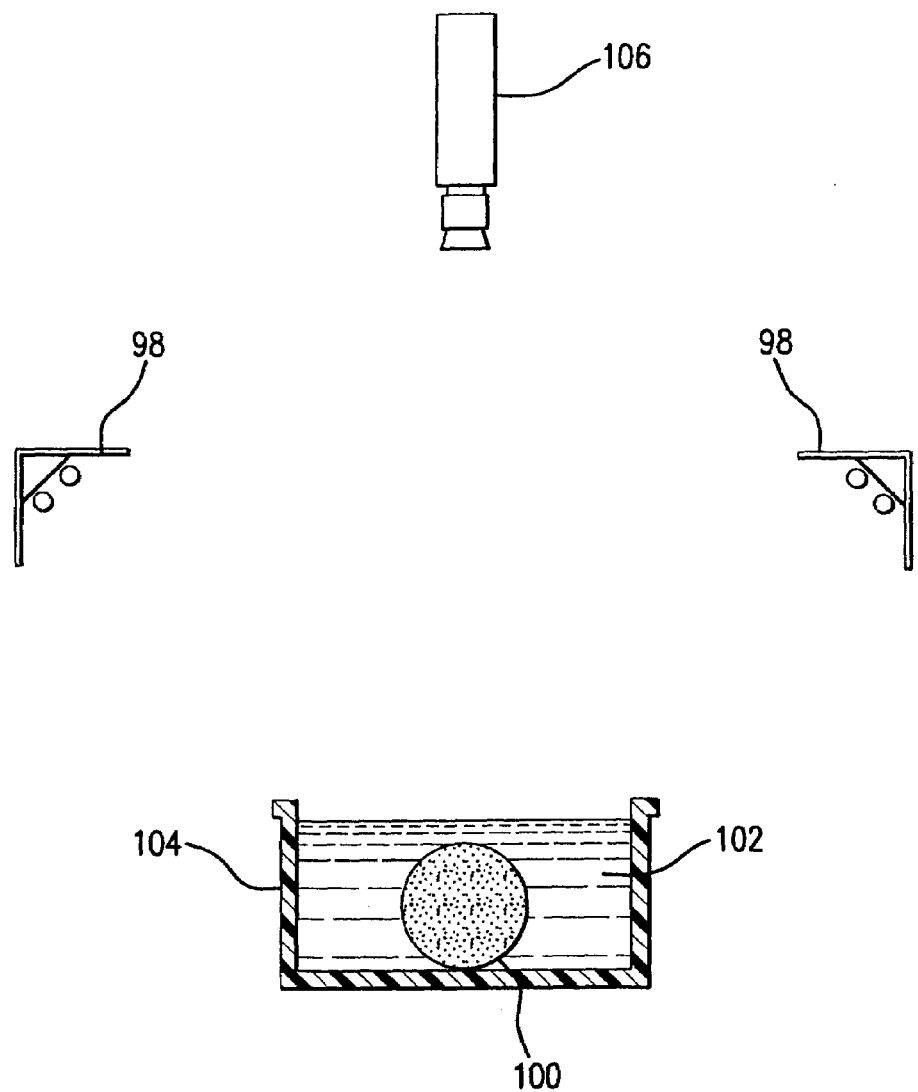
FIG. 7 is a schematic of the setup for carrying out the Standard Mottling Test disclosed herein.

FIG. 7 provides a schematic illustration of the setup for carrying out the imaging of the chubs. In FIG. 7, lights 98 illuminates the upper surface chub 100 (containing a cooked meat product) which was immersed in water 102 which, in turn, was held in open tub 104. Camera 106 was used to record an image of the chub, which data was used to calculate the standard deviation indicative of the degree of mottling on the surface of chub 100. Lights 98 were positioned about 19 inches from one another. Camera 106 was positioned about 14 inches from the upper surface of chub 100. Lights 98 were positioned about 10 inches from the surface of chub 100.

Several different coating formulations similar to Coating Formulation No. 1 (set forth above) were prepared and tested using the setup schematically illustrated in FIG. 7, as described above. However, the level of liquid smoke in the formulation was varied by factors of 0×, 0.25×, 0.5×, 1.0×, and 2.0×, with the amount of all other components in the coating formulation being kept constant, i.e., the same as in Coating Formulation No. 1, set forth above. The coated film was used for packaging a chub in accordance with the Standard Mottling Test, set forth above, with the results being set forth in Table 5, below. In each chub, three different areas were evaluated for mottling, totaling about 95% of the total surface area of the chub, with each of the three results being averaged in the column on the far right.

TABLE 5

| Sample No. | Liquid Smoke Factor | Pixel Area (sq. pixels) | Mean Pixel Value | Std. Dev. | Avg. Std. Dev. |
|---|---|---|---|---|---|
| 1-1 | 0 | 90531 | 92.85 | 23.52 | |
| 1-2 | 0 | 96000 | 92.78 | 25.36 | 23.3 |
| 1-3 | 0 | 83825 | 96.98 | 21.0 | |
| 2-1 | 0.25 | 94842 | 96.57 | 18.11 | |
| 2-2 | 0.25 | 91298 | 96.65 | 18.22 | 17.59 |
| 2-3 | 0.25 | 89094 | 105.02 | 16.44 | |
| 3-1 | 0.5 | 96758 | 98.94 | 18.09 | |
| 3-2 | 0.5 | 97034 | 98.19 | 19.1 | 18.55 |
| 3-3 | 0.5 | 91776 | 104.7 | 18.45 | |
| 4-1 | 1 | 87200 | 94.72 | 12.86 | |
| 4-2 | 1 | 92904 | 99.98 | 12.14 | 12.56 |
| 4-3 | 1 | 79514 | 96.01 | 12.67 | |
| 5-1 | 2 | 95800 | 94.58 | 13.85 | |
| 5-2 | 2 | 86400 | 101.67 | 15.72 | 13.44 |
| 5-3 | 2 | 93405 | 90.67 | 10.76 | |

Figure 8:
FIGS. 8, 9, and 10 are photographs of three different chubs, illustrating 3 different degrees of mottling.
Figure 9:

As can be seen by correlating the above average standard deviation numbers a well as the photographic images presented in FIGS. 7, 8, and 9, average standard deviation is higher for more mottling, and lower for less mottling. Surprisingly, the combination of binder, caramel and liquid smoke resulted in decreased mottling as the amount of liquid smoke increased up to a liquid smoke factor of 1. Average standard deviation appears to level out for a liquid smoke factor of about 1.0 and higher, which is the region of greatest effect of the liquid smoke as a crosslinker which reduces mottling.

Figure 10:

FIGS. 8, 9, and 10 are photographs illustrating three different chubs, each having a different degree of mottling than the other. In addition to the above quantitative test which expresses color variation in terms of standard deviation of various pixel values obtained for the chub, qualitative evaluation has also been performed. On a scale of 1 to 3, with 3 representing an undesirably high degree of mottling and 1 representing a low degree of mottling or no visible mottling, the chub illustrated in FIG. 8 exhibited a level of mottling of 3. The chub of FIG. 9 exhibited a level of mottling of 2.5, and the chub of FIG. 10 illustrated a degree of mottling of 1. The film according to the present invention, when subjected to a Standard Mottling Test as described above, exhibits a degree of mottling of from about 1 to about 2.5, more preferably from about 1 to 2.

Without being limited by the theory set forth below, a highly preferred embodiment of the present invention is believed to operate as follows. A thermoplastic film is coated with an aqueous coating composition comprising: (a) a binder which is a hydrocolloid (e.g., a polysaccharide) or a protein, together with (b) an additive, (c) a plasticizer, (d) a crosslinking agent, and (e) water. The liquid composition is coated onto the thermoplastic film, and adheres to the film upon drying, due to the polar interaction between the film and the binder. Moreover, the dried composition is rendered more flexible due to presence of the plasticizer. The dried composition, in the form of a coating, is cohesive because of the nature of the binder and the crosslinking agent. Upon exposing the coating to a flowing high moisture meat product, the coating remains adhered to the thermoplastic film because of the high level of adhesion of the coating to the film. While rapid hydration alone would cause a loss of adhesion of the coating to the film, the nature of the binder, together with the crosslinking agent, is believed to control the rate of hydration of the coating. This controlled rate of hydration permits, for example, the filling of a casing to form a chub, and the interim storage of the uncooked chub, without the coating components becoming unbound from the film prior to the initiation of cooking. However, upon initiating cooking, the coating forms a hydrated gel which thereafter transfers to the meat product. The transfer includes the binder, the additive, and the crosslinking agent, which adhere to the meat product via various bonds formed between the binder and the meat protein, especially the myofibrillar protein. The bond between the binder and the myofibrillar protein results in the formation of a skin, which reduces the tendency for the meat to form purge.

Although the present invention has been described with reference to particular means, materials, and embodiments, it should be noted that the invention is not to be limited to the particulars disclosed, and extends to all equivalents of the expressly claimed subject matter.

What is claimed is:

1. A multilayer additive-transfer film suitable for cook-in processing of food products, comprising:
   (A) a first layer, comprising
      (i) a binder comprising at least one member selected from the group consisting of polysaccharide and protein, and
      (ii) a crosslinking agent comprising a compound with at least two carbonyl groups;
   (B) a second layer, comprising a non-water-soluble thermoplastic polymer comprising at least one member selected from polyolefin, polyamide, polyester, polyvinylidene chloride, polyvinyl chloride, and polystyrene; and
   (C) a third layer, comprising
      (i) a binder comprising at least one member selected from the group consisting of polysaccharide and protein, and
      (ii) an additive comprising at least one member selected from the group consisting of flavor, fragrance, colorant, antimicrobial agent, antioxidant, chelating agent, and odor absorbent, said additive being bound to said binder with at least one member selected from a covalent bond, an ionic bond, a hydrogen bond, and a dipole-dipole interaction;
   wherein,
      the first layer is positioned between the second and third layers; and
      during cooking of a food product surrounded by said multilayer additive-transfer film, at least a portion of said binder and said additive in said third layer are transferred from said third layer to the food product.

2. The multilayer film of claim 1, further including a crosslinking agent in the third layer.

3. The multilayer film of claim 1, further including an additive in the first layer.

4. The multilayer film of claim 1, wherein the binder in the first layer comprises at least one member selected from alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, chitosan, gliadin, glutenin, globulin, albumin, prolamin, thrombin, pectin, carrageenan, konjac flour-glucomannin, fibrinogen, casein, soy protein, whey protein, and wheat protein.

5. The multilayer film of claim 4, wherein the binder in the first layer comprises at least one member selected from alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, chitosan, globulin, albumin, thrombin, pectin, carrageenan, konjac flour-glucomannin, fibrinogen, casein, soy protein, and whey protein.

6. The multilayer film of claim 1, wherein the binder in the third layer comprises at least one member selected from alginate, methyl cellulose, hydroxypropyl starch, hydroxypropylniethyl starch, hydroxymethyl cellulose, hydroxypropyl cellulose, hydroxypropylmethyl cellulose, carboxymethyl cellulose, cellulose esterified with 1-octenyl succinic anhydride, chitin, chitosan, gliadin, glutenin, globulin, albumin, prolamin, thrombin, pectin, carrageenan, konjac flour-glucomannin, fibrinogen, casein, soy protein, whey protein, and wheat protein.

7. The multilayer film of claim 6, wherein the binder in the third layer comprises at least one member selected from cellulose esterified with 1-octenyl succinic anhydride, chitin, gliadin, glutenin, prolamin, and wheat protein.

8. The multilayer film of claim 1, wherein the crosslinking agent comprises at least one member selected from malose, glutaraldehyde, glyoxal, dicarboxylic acid, ester of dicarboxylic acid, urea formaldehyde, melamine formaldehyde, trimethylol-melamine, organic compound containing at least 2 sulfhydryl groups, and a component in liquid smoke comprising at least two carbonyl groups.

9. The multilayer film of claim 1, wherein the first layer is directly adhered to the second layer.

10. The multilayer film of claim 1, wherein the third layer is directly adhered to the first layer.

11. The multilayer film of claim 1, wherein the binder in the first layer comprises
    (A) a first binder comprising at least one member selected from alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan; and
    (B) a second binder comprising at least one member selected from gliadin, glutenin, globulin, albumin, prolarnin, thrombin, pectin, carrageenan, konjac flour-glucomannin, fibrinogen, casein, soy protein, whey protein, and wheat protein.

12. The multilayer film of claim 11, further including a crosslinking agent in the third layer.

13. The multilayer film of claim 11, further including an additive in the first layer.

14. A multilayer additive-transfer film suitable for cook-in processing of food products, comprising:
    (A) a first layer, comprising
        (i) a binder composition, comprising
            (a) a first binder comprising at least one member selected from alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan, and
            (b) a second binder comprising at least one member selected from gliadin, glutenin, globulin, albumin, prolamin, thrombin, pectin, carrageenan, konjac flour-glucomannin, fibrinogen, casein, soy protein, whey protein, and wheat protein,
        (ii) an additive comprising at least one member selected from the group consisting of flavor, fragrance, colorant, antimicrobial agent, antioxidant, chelating agent, and odor absorbent, said additive being bound to said binder composition with at least one member selected from a covalent bond, an ionic bond, a hydrogen bond, and a dipole—dipole interaction, and
        (iii) a crosslinking agent comprising a compound with at least two carbonyl groups; and
    (B) a second layer, comprising a non-water-soluble thermoplastic polymer comprising at least one member selected from polyolefin, polyamide, polyester, polyvinylidene chloride, polyvinyl chloride, and polystyrene,
    (C) a third layer wherein, the first layer is positioned between the second and third layers, and during cooking of a food product surrounded by said multilayer additive-transfer film, at least a portion of said binder composition and said additive in said first layer are transferred from said first layer to the food product.

15. The multilayer film of claim 14, wherein the third layer comprises at least one member selected from the group consisting of polysaccharide and protein.

16. The multilayer film of claim 15, further including a crosslinking agent in the third layer.

17. The multilayer film of claim 15, further including an additive in the third layer.

18. The multilayer film of claim 15, wherein the third layer comprises at least one member selected from alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, chitosan, gliadin, glutenin, globulin, albumin, prolamin, thrombin, pectin, carrageenan, konjac flour-glucomannin, fibrinogen, casein, soy protein, whey protein, and wheat protein.

* * * * *

UNITED STATES PATENT AND TRADEMARK OFFICE
CERTIFICATE OF CORRECTION

PATENT NO. : 7,183,006 B2 Page 1 of 1
APPLICATION NO. : 10/655846
DATED : February 27, 2007
INVENTOR(S) : Barmore et al.

It is certified that error appears in the above-identified patent and that said Letters Patent is hereby corrected as shown below:

Title Page Item (12) "Bamore et al." should be --Barmore et al.--
Title Page, Item (75) "Charles R. Bamore" should be --Charles R. Barmore--
Column 35, Line 15, "hydroxypropylniethyl starch" should be --hydroxypropylmethyl starch--
Column 35, LIne 47-48, "prolarnin" should be --prolamin--

Signed and Sealed this

Third Day of July, 2007

JON W. DUDAS
*Director of the United States Patent and Trademark Office*